United States Patent
Choi et al.

(10) Patent No.: US 9,736,392 B2
(45) Date of Patent: *Aug. 15, 2017

(54) METHOD AND APPARATUS FOR DETERMINING DISTANCE BETWEEN IMAGE SENSOR AND OBJECT

(71) Applicant: CENTER FOR INTEGRATED SMART SENSORS FOUNDATION, Daejeon (KR)

(72) Inventors: Sang Gil Choi, Yongin-si (KR); Jong Ho Park, Daejeon (KR); Chong Min Kyung, Daejeon (KR)

(73) Assignee: Dual Aperture International Co., Ltd. (KR)

( * ) Notice: Subject to any disclaimer, the term of this patent is extended or adjusted under 35 U.S.C. 154(b) by 233 days.

This patent is subject to a terminal disclaimer.

(21) Appl. No.: 14/521,241

(22) Filed: Oct. 22, 2014

(65) Prior Publication Data

US 2015/0310605 A1     Oct. 29, 2015

(30) Foreign Application Priority Data

Apr. 23, 2014     (KR) .................. 10-2014-0048590

(51) Int. Cl.
| | |
|---|---|
| *H04N 9/47* | (2006.01) |
| *H04N 9/80* | (2006.01) |
| *H04N 5/243* | (2006.01) |
| *G02B 5/28* | (2006.01) |
| *G01C 11/12* | (2006.01) |
| *G06T 7/571* | (2017.01) |

(Continued)

(52) U.S. Cl.
CPC ............. *H04N 5/243* (2013.01); *G01C 11/12* (2013.01); *G02B 5/282* (2013.01); *G06T 7/571* (2017.01); *G06T 2207/10024* (2013.01); *G06T 2207/10048* (2013.01); *H04N 5/23212* (2013.01); *H04N 9/045* (2013.01)

(58) Field of Classification Search
None
See application file for complete search history.

(56) References Cited

U.S. PATENT DOCUMENTS

| 8,212,889 B2 | 7/2012 | Chanas et al. |
| 8,497,925 B2 | 7/2013 | Ogasahara |

(Continued)

FOREIGN PATENT DOCUMENTS

| CN | 101102408 | 1/2008 |
| CN | 101729770 | 6/2010 |

(Continued)

OTHER PUBLICATIONS

Japanese Application No. 2015-081823, Office Action issued on Mar. 29, 2016. 4 pages.

(Continued)

*Primary Examiner* — Hung Dang
(74) *Attorney, Agent, or Firm* — Schmeiser, Olsen & Watts LLP

(57) ABSTRACT

A method for determining a distance between an image sensor and an object includes acquiring a first image for an object and a second image distinguished from the first image, using a cut-off filter for cutting off one of R G and B signals, and determining a distance between the image sensor and the object.

18 Claims, 5 Drawing Sheets

(51) Int. Cl.
 *H04N 5/232* (2006.01)
 *H04N 9/04* (2006.01)

(56) References Cited

U.S. PATENT DOCUMENTS

| | | |
|---|---|---|
| 2008/0158377 A1 | 7/2008 | Chanas et al. |
| 2010/0066854 A1 | 3/2010 | Mather et al. |
| 2010/0289885 A1* | 11/2010 | Lu .................. H04N 5/2258 348/61 |
| 2011/0109749 A1 | 5/2011 | Chanas et al. |
| 2011/0234863 A1 | 9/2011 | Ogasahara |
| 2012/0162410 A1* | 6/2012 | Vaillant ............. G01C 3/085 348/135 |
| 2012/0176514 A1* | 7/2012 | Tsurube ............. G06T 5/50 348/234 |
| 2012/0242857 A1 | 9/2012 | Mather et al. |
| 2013/0033578 A1 | 2/2013 | Wajs |

FOREIGN PATENT DOCUMENTS

| | | |
|---|---|---|
| CN | 103209298 | 7/2013 |
| JP | 2008532449 A | 8/2008 |
| JP | 2010079298 A | 4/2010 |
| JP | 2011205307 A | 10/2011 |
| JP | 2013520855 A | 6/2013 |
| WO | 2014/008939 A1 | 1/2014 |

OTHER PUBLICATIONS

Alex Paul Pentland, "A New Sense for Depth of Field", IEEE Transactions on Pattern Analysis and Machine Intelligence, IEEE Computer Society, USA, vol. PAMI-09. No. 4, Jul. 1, 1987 pp. 523-531.

* cited by examiner

METHOD AND APPARATUS FOR DETERMINING DISTANCE BETWEEN IMAGE SENSOR AND OBJECT

This application claims priority from and the benefit of Korean Patent Application No. 10-2014-0048590, filed on Apr. 23, 2014, which is hereby incorporated by reference for all purposes as if fully set forth herein.

BACKGROUND OF THE DISCLOSURE

Field of the Disclosure

Exemplary embodiments of the disclosure relate a method and an apparatus for determining a distance between an image sensor and an object, more particularly, to a method for determining a distance between an image sensor and an object, using a diaphragm for cutting off one of red (R), green (G) and blue (B) received by the image sensor as well as a diaphragm of a lens.

Discussion of the Background

Conventional technology for determining a distance between an image sensor and an object measures the distance based on a disparity between images captured images by two cameras, using a difference of point views of the cameras. In this instance, a mechanical configuration of a module is enlarged and it is difficult to install such a module. Also, there is a disadvantage of a high cost.

To overcome such disadvantages, technology for determining the distance, using one camera is proposed. In a conventional technology for determining the distance, using one camera, a pin hole of a filter for cutting off an IR (Infrared ray) signal is used as a diaphragm and the distance between an image sensor and an object is determined based on a level of blur of an image configured of IR image acquired clearly and a RGB image configured of R, G and B signals acquired by a lens diaphragm. Hereinafter, the image sensor means a module configured of CIS (CMOS Image Sensor) and ISP (Image Signal Processor).

In the conventional technology for determining the distance between a conventional image sensor and an object, an image sensor has to include an auxiliary IR cell for processing the IR signal so as to acquire an image configured of IR signals. An apparatus for determining a distance between a conventional image sensor and an object has a disadvantage of an IR LED necessarily provided to generate an IR signal, in case of being indoor or at night.

In the conventional technology for determining the distance between the image sensor and the object might be generated the color reproduction having too many IR signals received via a pin hole provided in a cut-off filter of a cell for processing r, G and B signals. And an image quality of the RGB signal might deteriorate and it is difficult to use the technology as a camera. Even when a complex compensation circuit is further provided, a spectrum could differ based on a light source and it is then disadvantageously and basically difficult to solve such color reproduction.

In the present disclosure, a distance between an image sensor and an object is determined and proposed the technology for guaranteeing a quality of a RGB signal configured of an R signal, a G signal and a B signal, without auxiliary IR cells and IR LEDs.

SUMMARY OF THE DISCLOSURE

Exemplary embodiments of the present disclosure provide a method, an apparatus and a system for receiving a R signal, a G signal and a B signal except an IR signal from an image sensor, using an IR cut-off filter for cutting off an IR signal from a signal incident on an image sensor to guarantee a quality of a RGB image configured of a R signal, a G signal and a B signal even under the sun, without deteriorating a sense of a color.

Exemplary embodiments of the present disclosure also provide a method, an apparatus and a system determining a distance between an image sensor and an object, using a second image configured of one signal drawn via a pin hole of a cut-off filter and a first image configured of the other signals except one signal cut-off by a cut-off filter out of R, G and B signals passing a lens diaphragm and an IR cut-off filter.

Exemplary embodiments of the present disclosure also provide a method, an apparatus and a system for increasing a value of brightness for one signal drawn via a pin hole of a cut-off filter out of R, G and B signals to guarantee a quality of a RGB image configured of a R signal, a G signal and a B signal.

Exemplary embodiments of the present disclosure disclose a method for determining a distance between an image sensor and an object including acquiring a first image for an object and a second image distinguished from the first image, using a cut-off filter for cutting off one of R G and B signals; and determining a distance between the image sensor and the object.

The acquiring of the first image for the object and the second image may include acquiring the first image comprising the other signals except the one of the cut-off signal; and acquiring the second image configured of the one cut-off signal in response to inlet of the one cut-off signal via a pine hole of the cut-off filter.

The acquiring of the second image may further include amplifying a brightness value of the one cut-off signal.

The amplifying of the brightness value for the one cut-off signal may include increasing a gain of an amp connected to the image sensor, in case of processing the one cut-off signal in a cell for the one cut-off signal provided in the image sensor; and decreasing a gain of the amp, in case of processing at least one of the other signals in a cell for the at least one signal out of the other signal provided in the image sensor.

The method for determining the distance between the image sensor and the object may further include receiving the image sensor receiving the R signal, the G signal and the B signal, using an IR cut-off filter for cutting off an IR (Infrared ray) signal out of the signals incident on the image sensor.

The determining of the distance between the image sensor and the object may include determining a focal position of the image sensor and the object based on change in blur for the object provided in each of the first and second images; and calculating a distance between the image sensor and the focal position of the image sensor.

The method for determining the distance between the image sensor and the object may further include combining the first image and the second image and generating a RGB image configured of the R signal, the G signal and the B signal from the combination of the first and second images.

Exemplary embodiments of the disclosure also provide a recording media readable by a computer in which a program for performing one of the steps claimed in 1 through 7.

Exemplary embodiments of the disclosure also provide an apparatus for determining a distance between an image sensor and an object including a cut-off filter for cutting off one of received R (Red), G (Green) and B (Blue) signals; an image sensor for acquiring a first image for an object and a second image distinguished from the first image, using the cut-off filter; and a distance determination unit for determining a distance between the image sensor and the object based on change in blur for the object provided in each of the first and second images.

The image sensor may acquire the first image configured of the other signals except the on cut-off signal out of the R, G and B signals, using the cut-off filter, and acquire the second image configured of the one cut-off signal in response to inlet of the one cut-off signal via a pin hole of the cut-off filter.

The image sensor may include an amplification unit for amplifying a brightness value for the one cut-off signal.

The amplification unit may increase a gain of an amp connected to the image sensor, in case of processing the one cut-off signal in a cell for the one cut-off signal provided in the image sensor, and decrease a gain of the amp, in case of processing at least one of the other signals in a cell for at least one of the other signals provided in the image sensor.

The apparatus for determining the distance between the image sensor and the object may further include an IR cut-off filter for cutting off an IR (Infrared ray) signal out of signals incident on the image sensor to allow the image sensor to receive the R, G and B signals.

The distance determination unit may determine a distance between a focal position of the image sensor and the object based on change in blur for the object provided in each of the first and second images, and determine a distance between the image sensor and the focal of image sensor.

The image sensor may combine the first image and the second image with each other and generate a RGB image configured of the R signal, the G signal and the B signal from combination of the first and second images.

It is to be understood that both the foregoing general description and the following detailed description are exemplary and explanatory and are intended to provide further explanation of the disclosed subject matter as claimed.

Exemplary embodiments of the present disclosure provide a method, an apparatus and a system for receiving a R signal, a G signal and a B signal except an IR signal from an image sensor, using an IR cut-off filter for cutting off an IR signal from a signal incident on an image sensor to guarantee a quality of a RGB image configured of a R signal, a G signal and a B signal even under the sun, without deteriorating a sense of a color.

Exemplary embodiments of the present disclosure also provide a method, an apparatus and a system determining a distance between an image sensor and an object, using a second image configured of one signal drawn via a pin hole of a cut-off filter and a first image configured of the other signals except one signal cut-off by a cut-off filter out of R, G and B signals passing a lens diaphragm and an IR cut-off filter.

Exemplary embodiments of the present disclosure also provide a method, an apparatus and a system for increasing a value of brightness for one signal drawn via a pin hole of a cut-off filter out of R, G and B signals to guarantee a quality of a RGB image configured of a R signal, a G signal and a B signal.

BRIEF DESCRIPTION OF THE DRAWINGS

The accompanying drawings, which are included to provide a further understanding of the disclosed subject matter and are incorporated in and constitute a part of this specification, illustrate exemplary embodiments of the disclosed subject matter, and together with the description serve to explain the principles of the disclosed subject matter.

DETAILED DESCRIPTION OF THE ILLUSTRATED EMBODIMENTS

Figure 1:
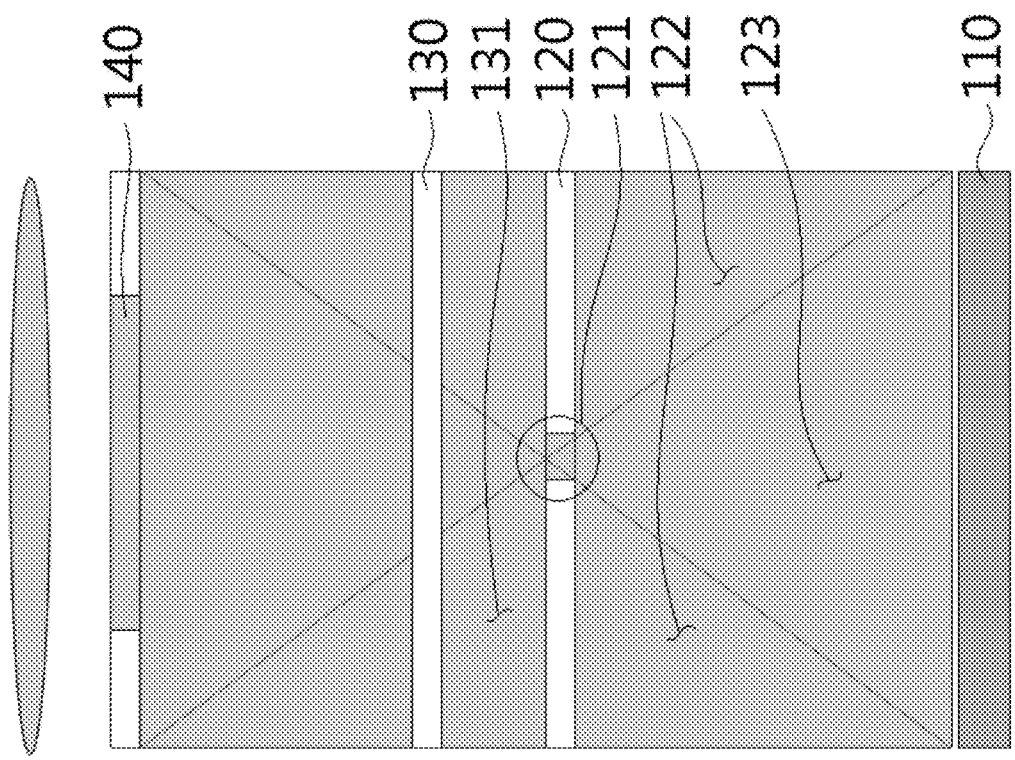
FIG. 1 is a diagram illustrating an apparatus for determining a distance between an image sensor and an object according to exemplary embodiments of the disclosure.

Exemplary embodiments of the disclosed subject matter are described more fully hereinafter with reference to the accompanying drawings. The disclosed subject matter may, however, be embodied in many different forms and should not be construed as limited to the exemplary embodiments set forth herein. Rather, the exemplary embodiments are provided so that this disclosure is thorough and complete, and will convey the scope of the disclosed subject matter to those skilled in the art. In the drawings, the size and relative sizes of layers and regions may be exaggerated for clarity. Like reference numerals in the drawings denote like elements.

It will be understood that when an element or layer is referred to as being "on", "connected to", or "coupled to" another element or layer, it can be directly on, connected, or coupled to the other element or layer or intervening elements or layers may be present. In contrast, when an element is referred to as being "directly on", "directly connected to", or "directly coupled to" another element or layer, there are no intervening elements or layers present. As used herein, the term "and/or" includes any and all combinations of one or more of the associated listed items. It may also be understood that for the purposes of this disclosure, "at least one of X, Y, and Z" can be construed as X only, Y only, Z only, or any combination of two or more items X, Y, and Z (e.g., XYZ, XYY, YZ, ZZ).

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another region, layer or section. Thus, a first element, component, region, layer, or section discussed below could be termed a second element, component, region, layer, or section without departing from the teachings of the present disclosure.

The terminology used herein is for the purpose of describing exemplary embodiments only and is not intended to be limiting of the disclosed subject matter. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the disclosed subject matter are described herein with reference to cross-section illustrations that are schematic illustrations of idealized embodiments (and intermediate structures) of the disclosed subject matter. As such, variations from the shapes of the illustrations as a result, for example, of manufacturing techniques and/or tolerances, are to be expected. Thus, exemplary embodiments of the disclosed subject matter should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a diagram illustrating an apparatus for determining a distance between an image sensor and an object according to exemplary embodiments of the disclosure.

Referring to FIG. 1, an apparatus for determining a distance between an image sensor and an object according to one embodiment of the disclosure may include an image sensor 110, a cut-off filter 120, an IR cut off 130 and a distance determination unit. A pin hole 121 of the cut-off filter 120 may be functioned as a diaphragm.

The IR cut-off filter 130 may cut off an IR signal from a signal incident through the lens diaphragm 140 (e.g., a signal including a RGB signal and an IR signal), such that only the RGB signal can be incident on a second region 131.

The image sensor 110 may receive an R signal, a G signal and a B signal out of the incident signal, except the IR signal cut off by the IR cut-off filter 130. Although not shown in the drawings, the image sensor 110 may include an R cell for processing the R signal, a G cell for processing the G signal and a B cell for processing the B signal as a module configured of CIS and ISP. At this time, each of the R cell, the G cell and the B cell may operate independently such that the image sensor 110 may process only the R signal, the G signal or the B signal independently or all of the R, G and B signals at a time.

The cut-off filter 120 may cut off one of the R, G and B signals received by the image sensor 110. For instance, the cut-off filter 120 cuts off one of the R, G and B signals received by the image sensor 110. For instance, in case of an R cut-off filter for cutting off the R signal, the cut-off filter 120 passes the G signal and the B signal there through to allow them to reach the G cell and the B cell of the image sensor 110, respectively. The pine hole 121 of the cut off filter 120 is functioned as a diaphragm and the R signal may reach the R cell of the image sensor 110 only through the pin hole 121. Accordingly, the G signal and the B signal are incident on 1-1 region 122 and 1-2 region 123 and reach the G cell and the B cell of the image sensor 110, respectively. In contrast, only the R signal passing through the pin hole 121 may be incident on 1-2 region 123. Hereinafter, the pin hole 121 will be configured as a pin hole provided in the R cut-off filter for cutting off the R signal and the embodiments of the disclosure are not limited thereto. The pin hole 121 may be a pin hole provided in a G cut-off filter for cutting off the G signal or a B cut-off filter for cutting off the B signal, which will be described in detail later, referring to FIG. 2.

Accordingly, the image sensor 110 receives and processes the other signals except one signal cut off by the cut-off filter out of the R, G and B signals, only to acquire a first image configured of the other signals except the one cut-off signal. Also, the image sensor 110 receives and processes the one cut off signal out of the R, G and B signals, only to acquire a second image configured of one cut off signal. For instance, the image sensor 110 may acquires a first image configured of G and B signals except the R signal cut off by the cut off filter 120 and a second image configured of an R signal drawn through the pin hole 121 of the cut-off filter 120.

At this time, the image sensor 110 may increase a value of brightness for the one cut off signal, to prevent a quality of the second image configured of the cut off one signal drawn through the pin hole 121 from deteriorated by a decreased value of brightness for the one cut off signal when the one signal cut off the cut-off filter 120 is drawn through the pin hole 121 of the cut off filter 120. Such a process of brightness value increase may be performed by an amplification unit provided in the image sensor 110. However, the amplification unit may be embedded in the image sensor 110 or an independent module. Specifically, in case of processing one signal cut off in a cell for processing one cut off signal provided in the image sensor 110, the amplification unit increases a gain of an amp connected with the image sensor 110. In case of processing at least one of the other signals in a cell for processing the other signals except one cut off signal, the amplification unit decreases a gain of the amp. Accordingly, a value of brightness for the one cut off signal can be amplified. For instance, the amplification unit increases a gain of the amp in case of processing a line of R cell provided in the image sensor 110 and decreases a gain of the amp in case of processing a line of G cell and B cell, such that a value of brightness for R signal can be amplified. That will be described in detail later, referring to FIG. 3.

The operation of the image sensor 110 to amplify the brightness value for one cut off signal may be performed after increasing exposure of the R, G and B signals incident via the IR cut off filter 130. Accordingly, the brightness value for one cut off signal incident via the pin hole 121 of the cut-off filter 120, without increasing noise.

The distance determination unit determines a distance between the image sensor 110 and an object based on change in blur for an object provided in each of the first and second images. At this time, the distance determination unit determines a distance between a focus of the image sensor 110 and an object and calculates a distance between a focus of the image sensor 110 and the image sensor 110. The distance determination unit may determine a distance between the image sensor 110 and an object based on a value gained by adding the determined distance between the focus of the image sensor 110 and the object to the calculated distance between the image sensor 110 and the focus of the image sensor. Although it is shown in the drawings that the distance determination unit is embedded, the distance determination unit may be provided as an auxiliary module.

Diverse conventional algorithms may be applied to the algorithm of determining the distance between the image sensor 110 and the object based on the change in the blur for the object provided in each of the first and second images.

For instance, the distance determination unit may determine a distance between the image sensor 110 and an object based on change in blur for an object provided in each of the first and second images, using two picture matching curve information calculated before. The distance determination unit may determine the number of convolutions used in blurring one of the first and second images and even the other. Also, it may determine the distance between the image sensor 110 and the object, using the determined number of the convolutions.

The two picture matching curve information is the physical quantity calculated from the data captured by a camera device using CCD (Charge Coupled Device) or CMOS (Complimentary Metal-Oxide Semiconductor). A specific point on the two picture matching curve information is generated according to a following method. A picture of an examination target or an object is captured for a focal position of a specific camera with respect to zoom or aperture of a fixed camera. After that, the camera focal position is changed as much as a predetermined amount and another picture (a second picture) is captured. Hence, change in blurring for the examination target or the object is calculated and processes for different camera focal positions are repeated, only to generate the two picture matching curve information. When neighboring camera focal positions are repeatedly changed as much as a fixed amount corresponding to M depths (M is the amount of non-zero rational numbers), the two picture matching curve calculated, using Gaussian convolution kernel, is theoretically linear. The curve increases/decreases monotonically. Even the camera focal position is relatively changed as much as the fixed M depth with respect to the former camera focal position for a new camera focal position, the linearity exists even in a fixed range.

In case of a natural scene, the repetitions are calculated in non-overlapped regions and related to that. At this time, the number of the repetitions may mean convolutions and it is used in determining a relative order of objects in the natural scene (for example, determining which objects are closer to the camera or which objects are farther from the camera) or in approximately estimating an actual distance of objects in the scene. The matrix having the repetition information is defined as iteration map.

For example, a scene has a following basic 3×3 repetition map:

$$\begin{matrix} -5 & 3 & 1 \\ 2 & 8 & 6 \\ 4 & -7 & 3 \end{matrix}$$

When an upper left corner of the matrix is defined as an entry (1, 1) and a lower right corner of the matrix is defined as an entry (3, 3), an object located in an entry (2, 2) is corresponding to a repetition map number 8 and this object is the closest to the camera. Similarly, an object located in an entry (3, 2) corresponding to a repetition map number −7 is the farthest one from the camera. An object located in an entry (1, 3) corresponding to a repetition map number 1 is the closest to a current focal position of the camera.

A dimension of the repetition map is n×m and the repetition map includes non-overlapped regions having two depths corresponding to boundary regions (a foreground object and a background object). The repetition map information is inaccurate in those positions. Typically, basic filtering or clustering scheme may be used in enhancing repetition map estimation for non-boundary positions. After that, the repetition map information may be used in determining a relative object distance and an accurate object distance. However, under the assumption that the object has several non-overlapped regions and neighboring entries in a repetition map, a simple clustering scheme is selected and a relative object distance may be determined.

When locations of neighboring cameras are corresponding to movement of M depth, a repetition number for calculating an object distance may be used. Assuming that a repetition number for an object located in a current focal position is "K", K is corresponding to a picture number distant from N of a current focal position by [(N+8)−N=8]. After that, the object distance can be determined as 8*M depth.

Each of serial picture number locations is calculated from a mathematical formula. On possibility suggests that each of serial picture number position is calculated from a reference picture number 1 [or Nmax] or another picture number between 1 and Nmax as a front (or back) depth position. To calculate the object position, using the current camera focal position, a following code (sign(depth_of_fields)=1) may be applied. Each new camera focal position is calculated by replacement of a new calculated depth position. In a following example, a camera focal length and focal number and a start focal distance (corresponding to picture number N=1) are 63 mm, 5.2 and 1 cm, respectively. This process is repeated eight times to determine an object distance.1

```
flength_check = 63/1000; % unit of meters
fnumber = 5.2
%coc of camera - 0.18% unit of millimeters
distance_focus = 1; % unit of centimeters
depth_of_fields = 8;
H = ((flength * 100)^2) / (fnumber * 0.0018); % all unit now in cm
Dno = (H*distance_focus) / H+distance_focus);
Dfo = (H*distance_focus) / H−distance_focus);
if sign(depth of fields) == 1
    Dnew1 = Dfo;
    s_new = distance_focus; % Dfo;
    for loop_dof = 1:abs(depth_of_fields),
        Dnew1 = (H * s_new) / (H − s_new);
        s_new = Dnew1;
        distance1(loop_dof) = s_new;
    end
elseif sign (depth_of_fields) == −1
    %Dnew1 = Dno;
    s_new = distance_focus;
    for loop_dof = 1:abs (depth_of_fields)
        Dnew1 = (H * s_new) / (H + s_new);
        s_new = Dnew1;
        distance2(loop_dof) = s_new;
    end
else
    aa = 1 1 1 1 1 1 1 1 1 1 1 1 1 1 1 1 1 1 1 1 1 1 1 1
end
```

Similarly, rear depth positions may be calculated and used. In this instance, distance_focus=H/2[corresponding to N=Nmax] is used and sign(depth_of_fields) option is selected as −1.

New picture number positions may be calculated in a forward direction based on definition of depth in "a government-published textbook". In this instance, sign (depth_of_fields) is used and both directions of Dno1 and Dfo1 are calculated based on the mathematical formula mentioned above. A following equation is suggested to calculate a following focal position corresponding to a following picture number position.

$Dno2 = Dfo1;$ $distance\_focus2 = (Dno2 * H)/(H − Dno2);$

This process is repeated to generate all following focal positions.

$Dfo2=(H*distance\_focus2)/(H-distance\_focus2);$ $Dno3=Dfo2;$

New picture number positions are calculated in the reverse direction based on definition of depth in "a government-published textbook". In this instance, distance_focus=H/2 is used and both directions of Dno1 and Dfo1 are calculated based on the mathematical formula mentioned above. A following equation is suggested to calculate a following focal position corresponding to a following picture number position.

$Dfo2=Dno1;$ $distance\_focus2=(Dfo2*H)/(H+Dfo2);$

This process is repeated to generate all following focal positions.

$Dno2=(H*distance\_focus2)/(H+distance\_focus2);$ $Dfo3=Dno2;$

Other variations of equations and definitions may be used. Picture number positions are calculated, using a predetermined mathematical formula. Accordingly, the distance determination unit repeats the mathematical formula and determines an object depth related with a specific repetition number, such that the distance between the image sensor 110 and the object can be determined.

In another example of the algorithm, the distance determination unit may acquire a plurality of blurred patches, using a plurality of filters for a second image (the filters are distinguished from the cut-off filter 120 and the IR cut-off filter 130 mentioned above and they acquire a value through preset processing of an image). Then, the distance determination unit may calculate a difference between a first image and each of the acquired blurred-patches and determine the smallest value of the calculated differences as the distance between the image sensor 110 and the object.

The distance between the image sensor 110 and the object is not limited to a specific object but applied to all of the pixels arranged in the image sensor 110, such that a depth value of an image corresponding to each pixel may be acquired to generate a 3-dimensional image.

The apparatus for determining the distance between the image sensor 110 and the object includes only the cut-off filter 120 and the IR cut-off filter 130, without any auxiliary IR cells and IR LEDs, such that it can determine the distance between the image sensor 110 and the object, using the first image and the second image. At this time, the apparatus for determining the distance between the image sensor 110 and the object can use diverse distance determining algorithms, not limited to the algorithm for determining the image sensor 110 and the object mentioned above.

The image sensor 110 can generate a RGB image configure of an R signal G signal and a B signal from combination of first and second images. Accordingly, the apparatus for determining the distance between the image sensor 110 and the object may be used as a camera. To use the apparatus for determining the distance between the image sensor 110 and the object as the camera, a quality of the RGB image generated in the image sensor 110 has to be guaranteed. The apparatus for determining the distance between the image sensor 110 and the object according to one embodiment of the disclosure may prevent the IR signal from being received in the R cell, the G cell and the B cell provided in the image sensor 110 as mentioned above, only to guarantee the quality of the RGB image generated by the image sensor 110. Specifically, the apparatus for determining the distance between the image sensor 110 and the object includes an IR cut-off filter 130 for cutting off an IR signal out of signals incident on the image sensor 110 to allow the image sensor 110 to receive a R signal, a G signal and a B signal; and a cut-off filter 120 for cutting off one of the R, G or B signal with the IR signal cut off by the IR cut-off filter 130. Accordingly, the R cell, the G cell and the B cell provided in the image sensor 110 can be prevented from receiving the IR signal only to guarantee the quality of the RGB image generated by the image sensor 110. Specifically, the apparatus for determining the distance between the image sensor 110 and the object may include the IR cut-off filter 130 for cutting off the IR signal out of the signals incident in the image sensor 110 to allow the image sensor 110 to receive the R, G and B signals, and the cut-off filter 120 for cutting off the R, G or B signal with the IR signal removed, such that it can prevent the R cell, the G cell and the B cell from receiving the IR signal.

The second image configured of one signal drawn via a pin hole 121 of the cut-off filter 120 may be relatively darker than the first image configured of the other signals except the one signal cut off out of the R, G and B signals by the cut-off filter. Accordingly, when the RGB image is generated from combination of the first and second images, the apparatus for determining the distance between the image sensor 110 and the object may amplify a brightness value for the one signal drawn via the pin hole 121 of the cut-off filter 120, only to prevent the quality of the RGB image generated by the image sensor 110 from deteriorating. For instance, when processing the one signal cut off in a cell for processing the cut-off signal (a cell for processing the one signal drawn via the pin hole 121 of the cut-off filter 120), the apparatus for determining the distance between the image sensor 110 and the object may increase a gain of an amp connected to the image sensor 110. When processing the one signal out of the other signals in the cell for processing the other signals except the one cut-off signal, the apparatus for determining the distance between the image sensor 110 and the object may increase a brightness value of the signal drawn via the pin hole 121 of the cut-off filter 120 and then enhance the quality of the RGB signal, which will be described later, referring to FIG. 3.

Figure 2:
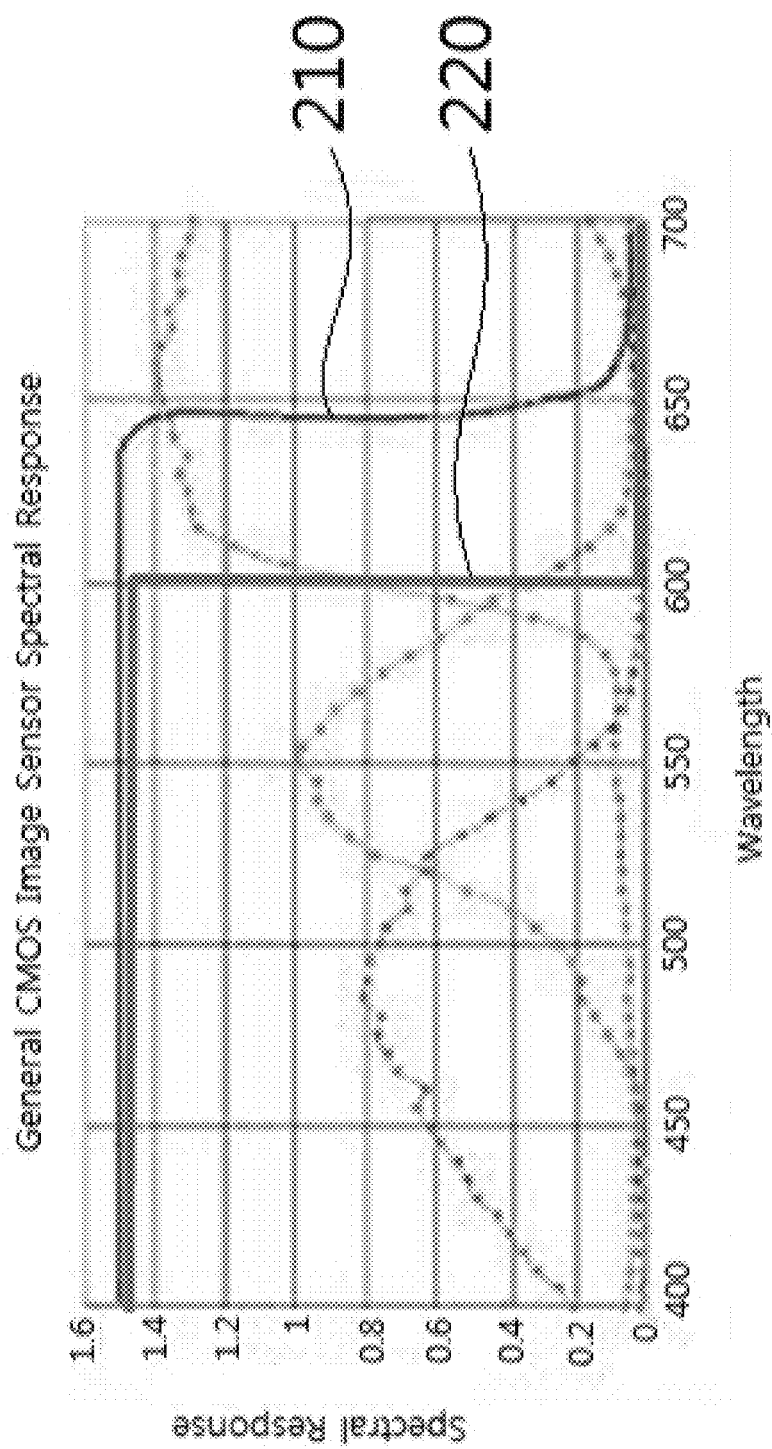
FIG. 2 is a diagram illustrating operations of an IR cut-off filter and a cut-off filter according to exemplary embodiments of the disclosure.

FIG. 2 is a diagram illustrating operations of an IR cut-off filter and a cut-off filter according to exemplary embodiments of the disclosure.

Referring to FIG. 2, the IR cut-off filter according to the embodiment of the disclosure may cut off the IR signal out of the signals incident via a lens (210). The signal having passed through the IR cut off filter may transmit light only in a wavelength corresponding to the R signal, the G signal and the B signal.

The cut-off filter cuts off one of the received R, G and B signals (220). For instance, when it is an R cut-off filter for cutting off an R signal, the cut-off filter sets a filter characteristic for passing the R and B signals there through and sets only a transmissivity of the G signal to be relatively low so as to cut off the G signal.

When it is a B cut-off signal for cutting off a B signal out of the R, G and B signals, the cut-off filter sets a filter characteristic to pass the R signal and the G signal there through and sets only a transmissivity of the B signal to be relatively low so as to cut off the B signal.

Figure 3:
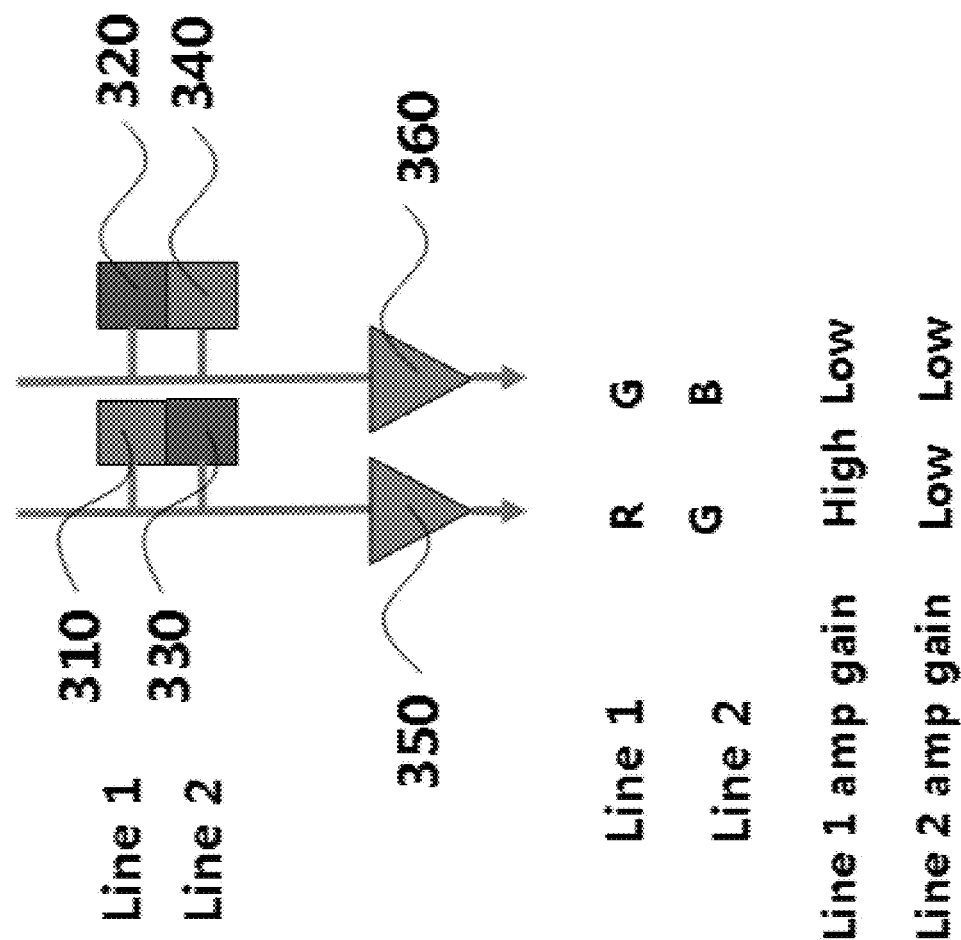
FIG. 3 is a diagram illustrating an operation of increasing a value of brightness for one cut off signal according to exemplary embodiments of the disclosure.

FIG. 3 is a diagram illustrating an operation of increasing a value of brightness for one cut off signal according to exemplary embodiments of the disclosure. Generally, cells configured of RG and GB are arranged repeatedly and a value of each cell is output for each line and an amp for amplifying output is connected to all of the cells arranged in a column.

Referring to FIG. 3, the apparatus for determining the distance between the image sensor and the object may further include an amplification unit for amplifying a brightness value for the one cut-off signal, in response to the inlet of the cut-off signal via the pin hole of the cut-off filter out of the R, G and B signals.

The amplification unit may increase or decrease a gain of an amp 350 and 360 connected to a R cell 310, a G cell 320 and 330 and a B cell 340 provided in the image sensor, to amplify the brightness value for the cut-off signal. For instance, when processing an R signal and a G signal in an R cell 310 and a G cell 330 which are arranged in the same column, the amplification unit may process the R signal in the R cell 310 and increase a gain of the amp 350 to output Line 1. The amplification unit may process the G signal in the G cell 330 and decrease a gain of the amp 350 to output Line 2. Accordingly, a brightness value of the R signal can be amplified.

The operation of the amplification unit for amplifying the brightness value for the one cut off signal may be performed after increasing exposure of the R, G and B signals drawn via the IR cut-off filter. Such the operation of the amplification unit may generate a RGB image having the guaranteed quality and it may be then used as the camera for determining the distance between the image sensor and the object.

Figure 4:
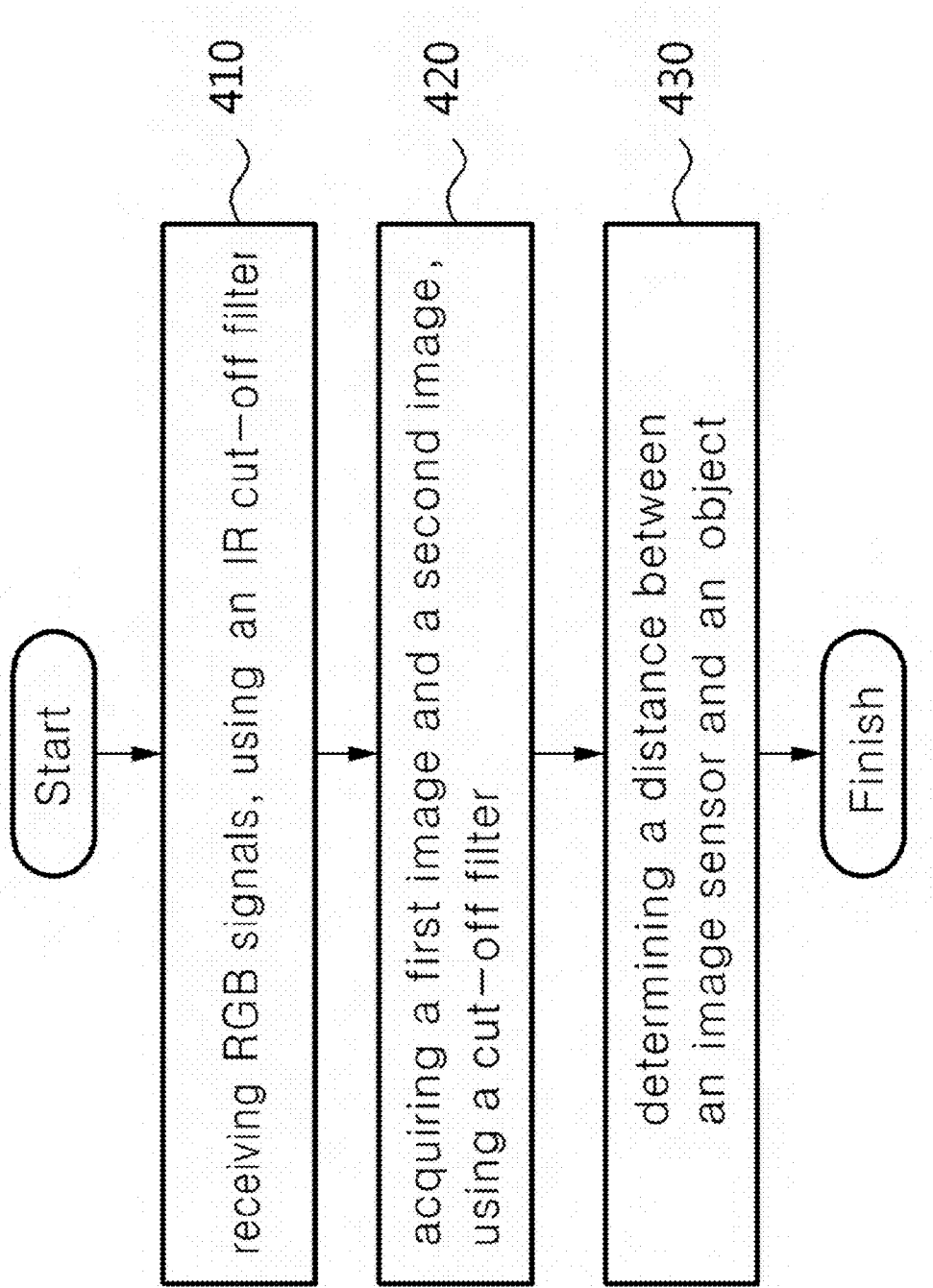
FIG. 4 is a flow chart illustrating a method for determining a distance between an image sensor and an object according to exemplary embodiments of the disclosure.

FIG. 4 is a flow chart illustrating a method for determining a distance between an image sensor and an object according to exemplary embodiments of the disclosure.

Referring to FIG. 4, the apparatus for determining the distance between the image sensor and the object according to the embodiment of the disclosure may allow an image sensor to receive a R signal, a G signal and a B signal, using an IR cut-off filter for cutting off an IR signal out of the signals incident on the image sensor (410).

Hence, the apparatus for determining the distance between the image sensor and the object may acquire a first image for the object and a second image distinguished from the first image, using a cut-off filter for cutting off one of the R (Red) and G (Green) and B (Blue) signals received thereby (420).

At this time, the apparatus for determining the distance between the image sensor and the object may acquire the first image configured of the other signals except the one cut off signal out of the R G and B signals, using a cut-off filter, and then the second image configured of the cut-off signal in response to inlet of the cut-off signal via a pin hole of the cut-off filter. The acquiring of the second image may include amplifying a brightness value for the cut-off signal. Specifically, the apparatus for determining the distance between the image sensor and the object may increase a gain of an amp connected to the image sensor, in case of processing the one signal cut off in a cell for the cut-off signal provided in the image sensor, and decrease a gain of the amp to amplify a brightness value for the cut-off signal, in case of processing at least one of the other signals in a cell for the at least one signal out of the other signals.

After that, the apparatus for determining the distance between the image sensor and the object determines a distance between the image sensor and the object based on change in blur for an object provided in each of the first and second images (430).

At this time, the apparatus for determining the distance between the image sensor and the object may determine a distance between a focal position of the image sensor and an object based on change in blur for the object provided in each of the first and second images and then calculate a distance between the image sensor and the focal position of the image sensor, only to determine the distance between the image sensor and the object. Specifically, the apparatus for determining the distance between the image sensor and the object may add the distance between the focal position of the image sensor and the object and the distance between the image sensor and the focal position of the image sensor to each other, only to determine the distance between the image sensor and the object.

Although not shown in the drawing, the apparatus for determining the distance between the image sensor and the object may combine the first image with the second image and generate a RGB image configured of the R, G and b signals from the combination of the first and second images. As mentioned above, the apparatus for determining the distance between the image sensor and the object may amplify a brightness value for the one cut-off signal and combine the first image and the second image with each other, only to generate the RGB signal from the combination of the first and second images. Specifically, in case of processing the one cut-off signal in the cell for the one cut-off signal provided in the image sensor, the apparatus for determining the distance between the image sensor and the object may increase a gain of an amp connected to the image sensor. In case of processing at least one of the other signals in a cell for at least one of the other signals provided in the image sensor, the apparatus for determining the distance between the image sensor and the object may decrease a gain of the amp and amplify a brightness value for the cut-off signal.

Figure 5:
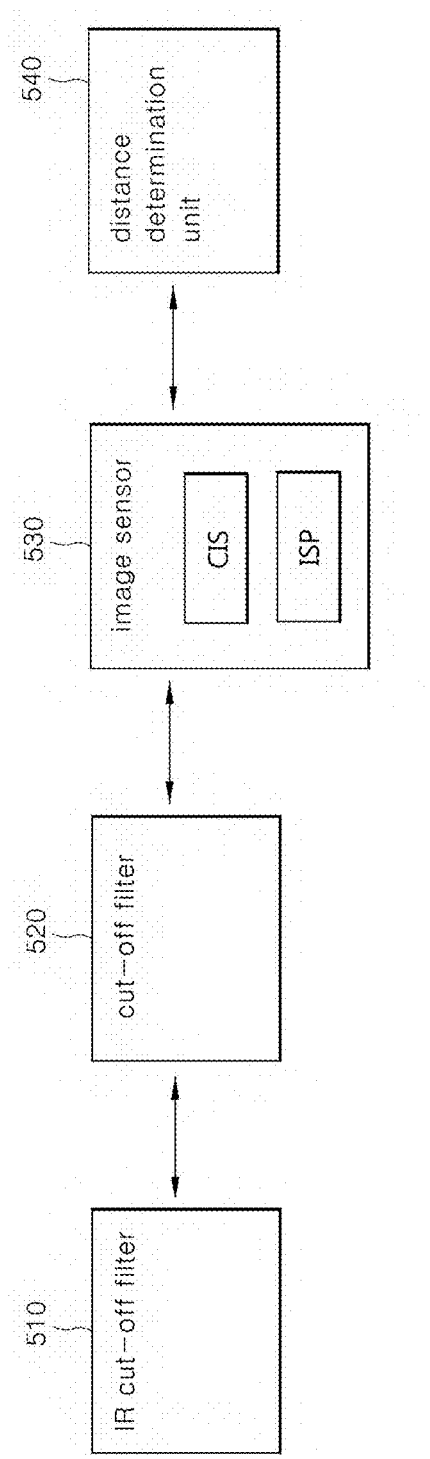
FIG. 5 is a block diagram illustrating an apparatus for determining a distance between an image sensor and an object according to exemplary embodiments of the disclosure.

FIG. 5 is a block diagram illustrating an apparatus for determining a distance between an image sensor and an object according to exemplary embodiments of the disclosure.

Referring to FIG. 5, the apparatus for determining the distance between the image sensor and the object according to the embodiment of the disclosure may include an IR cut-off filter 510, a cut-off filter 520, an image sensor 530 and a distance determination unit 540.

The IR cut-off filter 510 may cut off an IR (Infrared ray) signal out of the signals incident on an image sensor 530 and allow the image sensor 530 to receive an R signal, a G signal and a B signal. Accordingly, the apparatus for determining the distance between the image sensor and the object uses the IR cut-off filer 510 so as to make the R, G and B signals except the IR signal incident on the cut-off filter 520.

The cut-off filter 520 cuts off one of the received R (Red), G (Green) and B (Blue) signals.

The image sensor 530 acquires a first image for the object and a second image distinguished from the first image, using the cut-off filter. In this instance, the image sensor 530 may include a CIS and an ISP.

The image sensor 530 acquires the first image configured of the other signals except the one cut-off signal out of the R, G and B signals, using the cut-off filter 520, and a second image configured of the one cut-off signal in response to inlet of the cut-off signal via a pin hole of the cut-off filter 520.

Although not shown in the drawing, the image sensor 530 may further include an amplification unit for amplifying a brightness value for the one cut-off signal.

The amplification unit may increase a gain of an amp connected to the image sensor 530, in case of processing the one signal cut off in a cell for the cut-off signal provided in the image sensor 530. The amplification unit may decrease a gain of the amp and amplify a brightness value for the cut-off signal, in case of processing at least one of the other signals in a cell for at least one of the other signals in the image sensor 530.

The image sensor 530 may combine the first image and the second image with each other and generate a RGB signal configured of an R signal, a G signal and a B signal from the combined first and second images. At this time, the image sensor 530 uses the amplification unit in combining the second image configured of the one cut-off signal having the amplified brightness value and generating a RGB signal. The process of amplifying the one cut-off signal enabled by the amplification unit may be performed based on the operation of the amplification unit mentioned above.

The distance determination unit 540 may determine a distance between the image sensor and an object based on change in blur of the blur for an object provided in each of the first and second images.

The distance determination unit 540 may determine a distance between a focal position of the image sensor 530 and the object based on change in blue for the object provided in each of the first and second images and calculate a distance between the image sensor 530 and the focal position of the image sensor 530, only to determine a distance between the image sensor 530 and the object. Specifically, the distance determination unit 540 may add the distance between the focal position of the image sensor 530 and the object and the distance between the image sensor 530 and the focal position of the image sensor 530 to each other, only to determine the distance between the image sensor 530 and the object.

The apparatus method described hereinabove may be executed in any suitable device realized by hardware components, software components, and/or a combination of hardware and software components. For instance, the device and components may be realized by using one or more common computers or special purpose computers, which may include a processor, a controller, an Arithmetic Logic Unit (ALU), a digital signal processor, a microcomputer, a Field Programmable Array (FPA), a Programmable Logic Unit (PLU), a microprocessor. The device and components may implement an instruction and respond to the instruction. A processor may execute an operating system (OS) and one or more software applications running on the OS. The processor may store, process, and create data in response to the implementation of software.

The software may include a computer program, a code, an algorithm, an instruction, and any combination thereof. The software may include a mechanical language code made by a compiler and a high level language code implementable by a computer, using an interpreter, and the like. The software may be dispersed on a computer system or through a network. The software and data may be stored or implemented in one or more computer readable recording medium.

The method according to the embodiments of the disclosure may be realized as a program implementable by diverse computer means and it may be recorded in a computer readable medium as a program command. The computer readable medium may include a program command, a data file, a data structure or combination of them. The program command recorded in the medium may be configured for exemplary embodiments of the disclosure. Examples of computer readable medium include magnetic medium such as a hard disk, a floppy disk, optical medium such as CD-ROM and DVD, magneto-optical medium such as a floptical disk, and a hardware device such as ROM, RAM, and a flash memory. The hardware device may be configured to execute one or more software modules to implement the exemplary embodiments.

It will be apparent to those skilled in the art that various modifications and variations can be made in the present disclosure without departing from the spirit or scope of the disclosed subject matter. Thus, it is intended that the present disclosure cover the modifications and variations of the disclosed subject matter provided they come within the scope of the appended claims and their equivalents.

What is claimed is:

1. A method of determining a distance between an image sensor and an object by at least one of hardware components or software components, comprising:
    acquiring a first image of an object from the image sensor, wherein the first image is acquired from light passing through a cut-off filter that filters out at least one of red, green, or blue light signals;
    acquiring a second image distinguished from the first image, wherein the second image is acquired from light passing through a pin hole in the cutoff filter that is unfiltered by the cutoff filter;
    amplifying a brightness value of the second image by the at least one of hardware components or software components; and
    determining a distance between the image sensor and the object by a comparison of the first image and the amplified second image by the at least one of hardware components or software components.

2. The method of determining the distance between the image sensor and the object of claim 1, wherein the amplifying of the brightness value of the second image comprises:
    increasing a gain of an amplifier coupled to at least one cell of the image sensor associated with the at least one red, green, or blue light signals that are filtered out by the cut-off filter that pass through the pin hole in the cut-off filter.

3. The method of determining the distance between the image sensor and the object of claim 1, comprising:
    filtering out infrared light signals from being incident on the image sensor using an infrared cut-off filter.

4. The method of determining the distance between the image sensor and the object of claim 1, wherein the determining of the distance between the image sensor and the object comprises:
    determining a focal position of the image sensor and the object based on differences in blur of the object between the first image and the second image by the at least one of hardware components or software components; and
    calculating a distance between the image sensor and the focal position of the image sensor by the at least one of hardware components or software components.

5. The method of determining the distance between the image sensor and the object of claim 1, comprising:
    combining the first image and the second image and generating a RGB image using of the red signal, the green signal and the blue signal from the combination of the first image and the second image.

6. The method of determining the distance between the image sensor and the object of claim 1, wherein the amplifying of the brightness value of the second image comprises:

decreasing a gain of an amplifier coupled to at least one cell of the image sensor associated with the at least one of red, green, or blue light signals that passes through the cut-off filter.

7. A non-transitory computer-readable medium having embodied thereon a program, which when executed by a processor causes the processor to perform a method, the method comprising:
  acquiring a first image of an object from an image sensor, wherein the first image is acquired from light passing through a cut-off filter that filters out at least one of red, green, or blue light signals;
  acquiring a second image distinguished from the first image, wherein the second image is acquired from light passing through a pin hole in the cutoff filter that is unfiltered by the cutoff filter;
  amplifying a brightness value of the second image; and
  determining a distance between the image sensor and the object by a comparison of the first image and the amplified second image.

8. The non-transitory computer-readable medium of claim 7, wherein the amplifying of the brightness value of the second image comprises:
  increasing a gain of an amplifier coupled to at least one cell of the image sensor associated with the at least one red, green, or blue light signals that are filtered out by the cut-off filter that pass through the pin hole in the cut-off filter.

9. The non-transitory computer-readable medium of claim 7, wherein the amplifying of the brightness value of the second image comprises:
  decreasing a gain of an amplifier coupled to at least one cell of the image sensor associated with the at least one of red, green, or blue light signals that passes through the cut-off filter.

10. The non-transitory computer-readable medium of claim 7, comprising:
  filtering out infrared light signals from being incident on the image sensor using an infrared cut-off filter.

11. The non-transitory computer-readable medium of claim 7, wherein the determining of the distance between the image sensor and the object comprises:
  determining a focal position of the image sensor and the object based on differences in blur of the object between the first image and the second image by the at least one of hardware components or software components; and
  calculating a distance between the image sensor and the focal position of the image sensor by the at least one of hardware components or software components.

12. The non-transitory computer-readable medium of claim 7, comprising:
  combining the first image and the second image and generating a RGB image using of the red signal, the green signal and the blue signal from the combination of the first image and the second image.

13. An apparatus that determines a distance between an image sensor and an object comprising:
  a cut-off filter that filters out at least one of red, green, or blue light signals;
  an image sensor that acquires a first image of an object and a second image of an object, wherein:
    the first image is acquired from light passing through the cut-off filter incident on the image sensor, and
    the second image is acquired from light passing through a pin hole in the cutoff filter that is unfiltered by the cutoff filter incident on the image sensor;
  an amplification unit that amplifies a brightness value of the second image; and
  a distance determination unit that determines a distance between the image sensor and the object based on in blur for the object between the first image and the second image by at least one of hardware components or software components.

14. The apparatus that determines the distance between the image sensor and the object of claim 13, wherein the amplification unit increases a gain of an amplifier coupled to at least one cell of the image sensor associated with the at least one red, green, or blue light signals that are filtered out by the cut-off filter that pass through the pin hole in the cut-off filter.

15. The apparatus that determines the distance between the image sensor and the object of claim 13, comprising:
  an infrared cut-off filter that filters out infrared signals from being incident on the image sensor.

16. The apparatus that determines the distance between the image sensor and the object of claim 13, wherein the distance determination unit:
  determines a focal position of the image sensor and the object based on differences in blur of the object between the first image and the second image; and
  determines a distance between the image sensor and the focal of image sensor.

17. The apparatus that determines the distance between the image sensor and the object of claim 13, wherein the image sensor combines the first image and the second image with each other and generates a RGB image using of the red signal, the green signal and the blue signal from combination of the first image and the second image.

18. The apparatus that determines the distance between the image sensor and the object of claim 13, wherein the amplification unit decreases a gain of an amplifier coupled to at least one cell of the image sensor associated with the at least one of red, green, or blue light signals that passes through the cut-off filter.

* * * * *